(12) United States Patent
Jung

(10) Patent No.: US 9,507,470 B2
(45) Date of Patent: Nov. 29, 2016

(54) METHOD AND SYSTEM FOR REDUCED POWER TOUCH INPUT DETECTION ON AN ELECTRONIC DEVICE USING REDUCED SCANNING

(71) Applicant: Nvidia Corporation, Santa Clara, CA (US)

(72) Inventor: David Jung, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 14/107,845

(22) Filed: Dec. 16, 2013

(65) Prior Publication Data

US 2015/0169101 A1    Jun. 18, 2015

(51) Int. Cl.
G06F 3/041      (2006.01)
G06F 3/044      (2006.01)
G09G 5/00       (2006.01)

(52) U.S. Cl.
CPC ............ G06F 3/044 (2013.01); G06F 3/0416 (2013.01); G09G 5/006 (2013.01); G09G 2330/00 (2013.01); G09G 2330/021 (2013.01)

(58) Field of Classification Search
CPC ...... G06F 3/033; G06F 3/041; G06F 3/0416; G06F 3/047; G09G 2330/021
See application file for complete search history.

(56) References Cited

U.S. PATENT DOCUMENTS

| 5,124,804 A | 6/1992 | Socarras |
| 5,646,675 A | 7/1997 | Copriviza et al. |
| 5,995,081 A | 11/1999 | Kato |
| 7,441,233 B1 | 10/2008 | Orndorff |
| 8,525,799 B1 * | 9/2013 | Grivna et al. ................ 345/173 |
| 8,542,208 B2 * | 9/2013 | Krah et al. ..................... 345/173 |
| 8,773,386 B2 * | 7/2014 | Wilson et al. ................ 345/173 |
| 8,816,985 B1 * | 8/2014 | Tate et al. ..................... 345/173 |
| 8,963,881 B2 * | 2/2015 | Huang et al. ................. 345/174 |
| 8,970,506 B2 * | 3/2015 | Krah et al. ..................... 345/173 |
| 9,342,181 B2 | 5/2016 | Wyatt et al. |
| 2002/0085118 A1 | 7/2002 | Harris et al. |
| 2005/0012723 A1 * | 1/2005 | Pallakoff .............. G06F 1/1616 345/173 |
| 2005/0171879 A1 | 8/2005 | Lin |
| 2007/0268200 A1 * | 11/2007 | Fuller et al. .................. 345/1.1 |
| 2008/0036743 A1 | 2/2008 | Westerman |
| 2008/0082930 A1 | 4/2008 | Omernick et al. |
| 2008/0162996 A1 * | 7/2008 | Krah et al. ...................... 714/27 |

(Continued)

FOREIGN PATENT DOCUMENTS

| CN | 101673155 | 3/2010 |
| CN | 102187298 | 9/2010 |

*Primary Examiner* — Joe H Cheng

(57) ABSTRACT

Embodiments of the present invention can be configured to recognize and/or track certain types of touch input detected by a touch sensor, such as stylus input, during the performance of standard "full" touch scans in which each drive line of the touch sensor is generally scanned. Upon detection of these input types, "partial" touch scan operations can advantageously be performed which can dynamically reduce the number of lines scanned in a power-saving manner. These partial scans can be configured to intelligently initially scan the area where these input types were last detected so that there is minimal need to return to a previous "full" scan mode. If these specified touch inputs types are not detected during a "partial" scan mode, the touch sensor can be restored to a "full" scan mode until a subsequent detection of the touch input is determined, in which the touch sensor can be returned to a "partial" scan mode. Each time a partial scan is used, power is saved.

20 Claims, 9 Drawing Sheets

(56) References Cited

U.S. PATENT DOCUMENTS

| | | |
|---|---|---|
| 2008/0162997 A1 | 7/2008 | Vu et al. |
| 2008/0165141 A1 | 7/2008 | Christie |
| 2008/0284745 A1 | 11/2008 | Kao et al. |
| 2009/0167727 A1 | 7/2009 | Liu et al. |
| 2009/0224776 A1 | 9/2009 | Keith |
| 2009/0262637 A1 | 10/2009 | Badaye et al. |
| 2010/0097343 A1 | 4/2010 | Fang |
| 2010/0134437 A1 | 6/2010 | Yang et al. |
| 2010/0235732 A1 | 9/2010 | Bergman |
| 2010/0238130 A1 | 9/2010 | Lin et al. |
| 2010/0253639 A1 | 10/2010 | Huang et al. |
| 2011/0122088 A1 | 5/2011 | Lin et al. |
| 2011/0127340 A1 | 6/2011 | Aiken |
| 2011/0181519 A1 | 7/2011 | Tsai et al. |
| 2011/0261026 A1 | 10/2011 | Kim et al. |
| 2011/0273376 A1 | 11/2011 | Dickinson et al. |
| 2012/0030623 A1 | 2/2012 | Hoellwarth |
| 2012/0050206 A1 | 3/2012 | Welland |
| 2012/0054379 A1 | 3/2012 | Leung et al. |
| 2012/0068964 A1* | 3/2012 | Wright et al. ............... 345/174 |
| 2012/0084798 A1 | 4/2012 | Reeves et al. |
| 2012/0105357 A1* | 5/2012 | Li et al. .................... 345/174 |
| 2012/0105362 A1* | 5/2012 | Kremin et al. ............... 345/174 |
| 2012/0146957 A1 | 6/2012 | Dunagan |
| 2012/0154324 A1 | 6/2012 | Wright et al. |
| 2012/0176327 A1 | 7/2012 | Na et al. |
| 2012/0176546 A1 | 7/2012 | Yoon |
| 2012/0223894 A1 | 9/2012 | Zhao et al. |
| 2012/0262463 A1 | 10/2012 | Bakalash et al. |
| 2012/0327041 A1 | 12/2012 | Harley et al. |
| 2013/0038587 A1 | 2/2013 | Song et al. |
| 2013/0044078 A1 | 2/2013 | Hallenberg et al. |
| 2013/0069894 A1 | 3/2013 | Chen et al. |
| 2013/0100071 A1 | 4/2013 | Wright et al. |
| 2013/0135191 A1 | 5/2013 | Shiokawa |
| 2013/0194242 A1 | 8/2013 | Park et al. |
| 2013/0249823 A1 | 9/2013 | Ahn et al. |
| 2013/0265276 A1 | 10/2013 | Obeidat et al. |
| 2014/0028633 A1 | 1/2014 | Mercea et al. |
| 2014/0092031 A1* | 4/2014 | Schwartz et al. ............. 345/173 |
| 2014/0204036 A1 | 7/2014 | Schillings et al. |
| 2014/0267192 A1 | 9/2014 | Matsuura et al. |
| 2014/0340387 A1 | 11/2014 | Song et al. |
| 2015/0015497 A1 | 1/2015 | Leigh |
| 2015/0015528 A1* | 1/2015 | Vandermeijden ..... G06F 3/0416 345/174 |
| 2015/0029163 A1 | 1/2015 | Harris et al. |

* cited by examiner

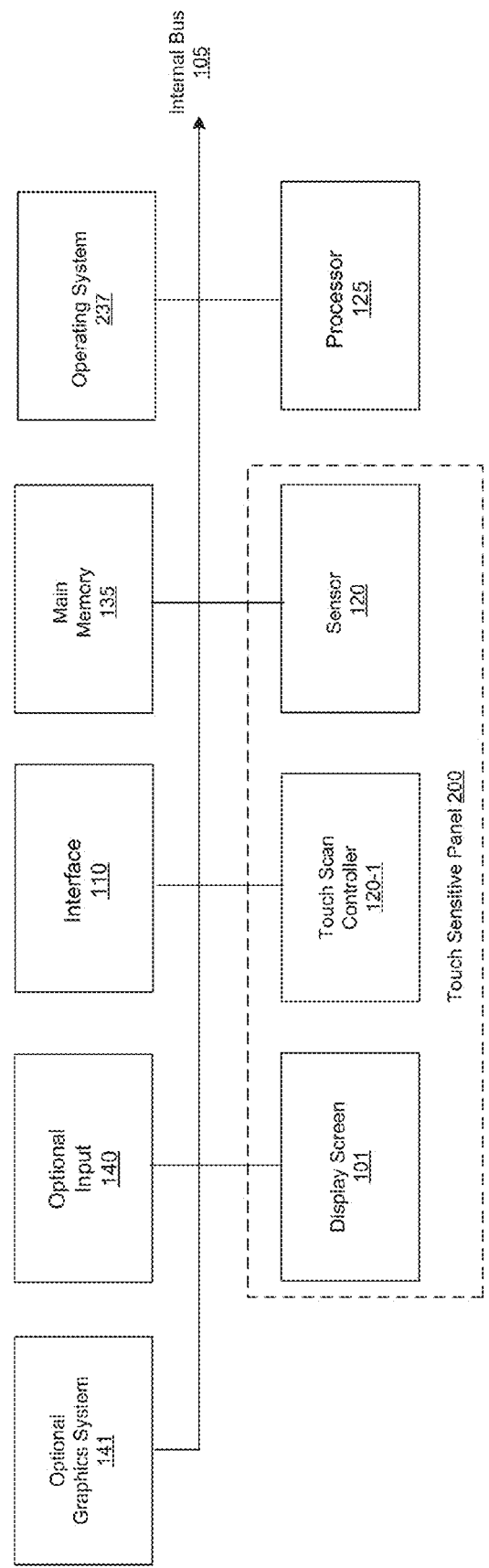

Exemplary Detection of Touch Input during a Full Scan Mode using Drive and Sense Line Configuration 300 determined by Touch Scan Controller 120-1

Exemplary Adjustment of Scanning Pattern by Touch Scan Controller 120-1 Responsive to Detection of Stylus Input Exemplary Adjustment of Scanning Pattern by Touch Scan Controller 120-1 using Drive and Sense Line Configuration 400 Responsive to Detection of Stylus Input Exemplary Re-Adjustment of Scanning Pattern by Touch Scan Controller 120-1 Responsive to a Subsequent Detection of Stylus Input Exemplary Adjustment of Scanning Pattern by Touch Scan Controller 120-1 Responsive to Acceptance of Stylus Input and/or Palm Input Exemplary Alternate Scan Line Scanning Pattern performed by Sensor 120 Responsive to Acceptance of Stylus Input and/or Palm Input

METHOD AND SYSTEM FOR REDUCED POWER TOUCH INPUT DETECTION ON AN ELECTRONIC DEVICE USING REDUCED SCANNING

FIELD OF THE INVENTION

Embodiments of the present invention are generally related to the field of touch sensitive devices.

BACKGROUND OF THE INVENTION

Conventional computer-implemented devices offer users a variety of different ways to interact with applications executed on these devices, such as through touchscreen panels. Touchscreen panels used by conventional mobile devices consume power partly based on how frequently the panel is "scanned" for touches. As such, faster touch scan rates are generally used by conventional mobile devices to improve the accuracy, smoothness, and latency of touch input received, which are all considered to be important performance metrics for electronic device including modern mobile devices. However, high scan rates translate to more power consumption, which is a negative for battery powered devices.

However, power usage on these mobile devices can become high when using a stylus to provide input on these mobile devices having high scan rates. This is generally due to "pen stroke lag," which is a phenomenon in which the time latency for pen to ink must be kept to a minimum. Accordingly, the inefficiencies associated with pen stroke lag may result in wasted power resources and may ultimately lead to reduced battery life.

SUMMARY OF THE INVENTION

What is needed is a solution that minimizes power usage on mobile devices in a manner that also improves user experience when using a stylus to provide input on these mobile devices. Embodiments of the present invention can be configured to recognize and/or track certain types of touch input detected by a touch sensor, such as stylus input, during the performance of standard "full" touch scans in which each drive line of the touch sensor is generally scanned. Upon detection of these input types, "partial" touch scan operations can advantageously be performed which can dynamically reduce the number of lines scanned in a power-saving manner. These partial scans can be configured to intelligently initially scan the area where these input types were last detected so that there is minimal need to return to a previous "full" scan mode. If these specified touch inputs types are not detected during a "partial" scan mode, the touch sensor can be restored to a "full" scan mode until a subsequent detection of the touch input is determined, in which the touch sensor can be returned to a "partial" scan mode. Each time a partial scan is used, power is saved.

More specifically, in one embodiment, the present invention is implemented as a method of performing touch scan operations on a touch sensitive panel of a computing device. The method includes scanning a first set of scan lines associated with the touch sensitive panel using a first scan pattern. In one embodiment, the partial scan further includes scanning using a second set of scan lines associated with a previous detection of the touch input, in which the second set of scan lines is a subset of the first set of scan lines. The method also includes detecting a touch input within the first set of scan lines using the first scan pattern, in which the touch input is recognized as a touch type that indicates a use case in which interaction with the touch sensitive panel is limited to the touch input. In one embodiment, the touch input is provided by a stylus tip.

Furthermore, the method includes, responsive to a detection of the touch input, partially scanning the touch sensitive panel using a second scan pattern to detect subsequent touch inputs of the touch type, in which the second scan pattern is different than the first scan pattern and in which less power is consumed by the computing device using the second scan pattern versus the first scan pattern. In one embodiment, the first set of scan lines includes a plurality of drive lines, in which the plurality of drive lines intersect with a plurality of sense lines to produce a plurality of sampling points used for detecting the touch input.

In one embodiment, the scanning using a second scan pattern further includes correlating a subset of scan lines from the first set of scan lines with a set of sampling points used from the plurality of sampling points to detect the touch input to produce the second scan pattern, in which the second scan pattern includes the subset of scan lines. In one embodiment, the correlating further includes registering a set of null input values for a remainder set of scan lines not associated with the subset of scan lines. In one embodiment, the method includes exiting the partial scanning responsive to the touch input being undetected after using the second scan pattern after a predetermined period of time and scanning the touch sensitive panel using the first set of scan lines.

In one embodiment, the present invention is implemented as a system for performing touch scan operations on a touch sensitive panel of a computing device. The system includes a touch sensor operable to scan a first set of scan lines associated with the touch sensitive panel using a first scan pattern and using a second scan pattern. In one embodiment, the touch sensor is operable to partially scan using a second set of scan lines associated with a previous detection of the touch input, in which the second set of scan lines is a subset of the first set of scan lines.

The system also includes a controller operable to detect a touch input within the first set of scan lines using the first scan pattern, in which the touch input is recognized as a touch type that indicates a use case of the computing device in which interaction with the touch sensitive panel is limited to the touch input, in which the touch sensor, responsive to a detection of the touch input of the touch type, is operable to partially scan using the second scan pattern determined by the controller to detect the touch input, in which the second scan pattern is different than the first scan pattern and in which less power is consumed by the computing device scanning with the second scan pattern versus scanning with the first scan pattern. In one embodiment, the touch input is provided by a stylus. In one embodiment, the first set of scan lines includes a plurality of drive lines, in which the plurality of drive lines intersect with a plurality of sense lines to produce a plurality of sampling points used for detecting the touch input.

In one embodiment, the controller is operable to correlate a subset of scan lines from the first set of scan lines with a set of sampling points used from the plurality of sampling points to detect the touch input to produce the second scan pattern, in which the second scan pattern includes the subset of scan lines. In one embodiment, the touch sensor is operable to register a set of null input values for a remainder set of scan lines not associated with the subset of scan lines. In one embodiment, the controller is operable to restore a default touch scan mode to the touch sensitive panel in which the first set of scan lines are scanned responsive to the touch input not being detected after using the second scan pattern after a predetermined period of time.

In one embodiment, the present invention is implemented as a method of performing touch scan operations on a touch sensitive panel of a computing device. The method includes scanning a first set of scan lines associated with the touch sensitive panel using a first scan pattern. The method also includes detecting a first touch input and a second touch input within the first set of scan lines using the first scan pattern, in which the first touch input is a touch type that indicates one of a use case of the computing device in which relevant interaction with the touch sensitive panel is limited to the first touch input. In one embodiment, the first touch input is provided by a stylus and the second touch input is provided by a palm of a user.

In one embodiment, the scanning further includes driving a voltage through a plurality of drive lines and the detecting a first touch input and a second touch input further includes using a plurality of sense lines to detect the first and second touch inputs, in which the plurality of drive lines overlap the plurality of sense lines to produce a plurality of sampling points, in which the first and second touch inputs are detected based on changes in capacitance within the plurality of sampling points. In one embodiment, the detecting a first touch input and a second touch input further includes swapping an orientation of the plurality of drive lines and the plurality of sense lines to detect positions associated with the first touch input and the second touch input.

Furthermore, the method includes, responsive to a detection of the first touch input, partial scanning using a second scan pattern to track the first touch input, in which the second scan pattern is different than the first scan pattern and where less power is consumed by the computing device using the second scan pattern versus the first scan pattern. In one embodiment, the using a second scan pattern further includes correlating a subset of scan lines from the first set of scan lines with a set of sampling points used from the plurality of sampling points to detect the first and second touch inputs to produce the second scan pattern, in which the second scan pattern includes the subset of scan lines. In one embodiment, the method includes tracking a position associated with the second touch input using a third scan pattern, in which the third scan pattern includes alternating scan lines within a subset of scan lines determined to be correlated with the second touch input.

BRIEF DESCRIPTION OF THE DRAWINGS

FIG. 1A is a block-level diagram depicting an exemplary touch scan adjustment system in accordance with embodiments of the present invention.

DETAILED DESCRIPTION

Figure 1B:
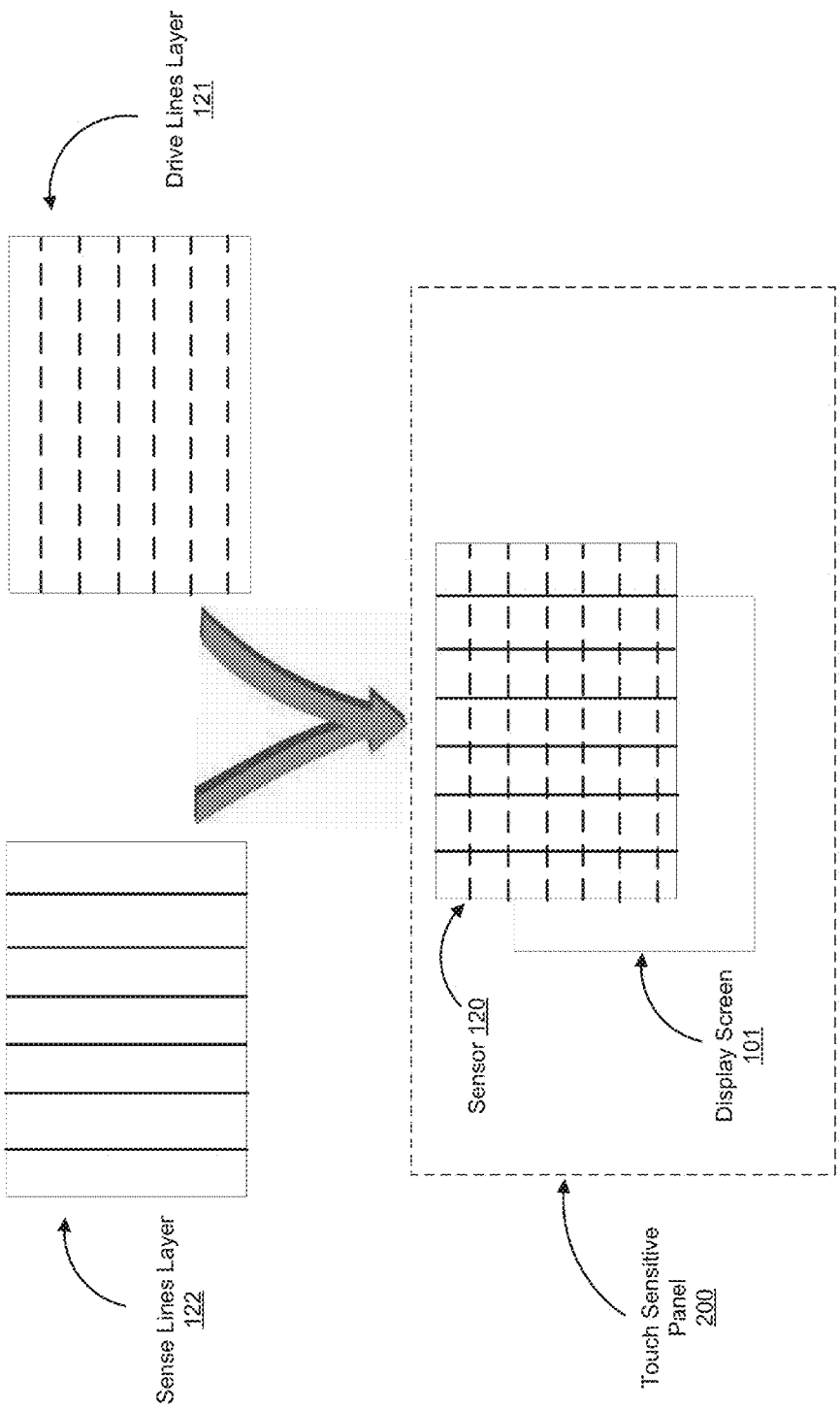
FIG. 1B depicts an exemplary touch scan sensitive panel in accordance with embodiments of the present invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Portions of the detailed description that follow are presented and discussed in terms of a process. Although operations and sequencing thereof are disclosed in a figure herein (e.g., FIG. 5) describing the operations of this process, such operations and sequencing are exemplary. Embodiments are well suited to performing various other operations or variations of the operations recited in the flowchart of the figure herein, and in a sequence other than that depicted and described herein.

As used in this application the terms controller, module, system, and the like are intended to refer to a computer-related entity, specifically, either hardware, firmware, a combination of hardware and software, software, or software in execution. For example, a module can be, but is not limited to being, a process running on a processor, an integrated circuit, an object, an executable, a thread of execution, a program, and or a computer. By way of illustration, both an application running on a computing device and the computing device can be a module. One or more modules can reside within a process and/or thread of execution, and a component can be localized on one computer and/or distributed between two or more computers. In addition, these modules can be executed from various computer readable media having various data structures stored thereon.

FIG. 1A is a block-level diagram of an exemplary capacitive touch device (e.g., computer system 100) capable of detecting touch input and correspondingly dynamically adjusting the performance of touch scans to conserve power in accordance with embodiments of the present invention. According to one embodiment of the present invention, computer system 100 comprises touch sensitive panel 200, main processor 125, operating system 237, main memory 135, interface 110, optional input 140, as well as optional graphics system 141. In one embodiment, operating system 237 may include application programming interfaces ("API") for communicating touch inputs received via touch sensitive panel 200 to applications executed from memory 135 (e.g., user space portion of main memory 135, etc.). Additionally, in one embodiment, computer system 100 can include a kernel level (not pictured) which includes touch input drivers, display controller drivers and/or graphics drivers, etc.

According to one embodiment of the present invention, touch sensitive panel 200 includes the functionality to detect occurrence of touch events by performing touch scan operations. As such, touch sensitive panel 200 can be a capacitive touch-sensing device that uses capacitance to detect touch events. For instance, FIG. 1B depicts exemplary components used by touch scan sensitive panel 200 to perform touch scan operations to detect touch events in accordance with embodiments of the present invention. Touch sensitive panel 200 can include a sense layer (e.g., sense lines layer 122) that includes a plurality of sense lines oriented in a vertical direction and a drive layer (e.g., drive lines layer 121) that includes a plurality of drive lines oriented in a horizontal direction. As such, these layers within touch scan sensitive panel 200 may be bonded together using materials capable of maintaining the capacitive qualities of touch sensitive panel 200. Any of a number of well-known patterns/panels can be used.

Furthermore, as illustrated in FIG. 1B, sensor 120 comprises the sense and drive layers stacked on top of each other in a manner that produces a matrix of overlapping sense and drive lines. For instance, in one embodiment, sense lines layer 122 can be placed on top of drive lines layer 121 such that the sense lines and drive lines of each respective layer are arranged in rows and columns in horizontal and vertical directions. The intersections of sense lines layer 122 and drive lines layer 121 within this matrix produces a plurality of interconnection points (e.g., sampling points) that may be spatially arranged in a manner such that each point represents a distinct location within sensor 120.

As such, during a powered state (e.g., using power resources coupled to computer system 100), drive lines supply current and the sense lines can detect changes within the voltage (or signal) at sampling points within the matrix. For instance, if an object (e.g., a stylus, finger, eraser, brush, etc.) touches sensor 120 during a powered state, the electrostatic field within a set of sampling points proximate to the object can be altered in a manner that reduces the mutual capacitance levels of other sampling points within sensor 120. In this manner, the location of the contact made between an object and sensor 120 can be accurately determined and communicated to touch scan controller 120 for further processing. Furthermore, in one embodiment, display screen 101 may reside beneath sensor 120 and include the functionality to render output. Examples of display screen 101 include, but are not limited to, a liquid crystal display (LCD), a plasma display, and the like.

In one embodiment, drive lines may be uniformly charged using the same voltage or individually charged with different voltages. In one embodiment, prescribed threshold values (e.g., voltages) assigned to each drive line may be stored within registers (not shown) coupled to sensor 120. In one embodiment, sensor 120 may include the functionality to convert analog signals discharged from a set of points associated with a particular sampling point into digital signals using analog-to-digital signal converters (e.g., ADCs) for further processing by components of computer system 100. For instance, in one embodiment, sensor 120 may use digital signals to create a digital contour map (e.g., 2 dimensional plot of magnitudes) with 2-D interpolation to determine the location of touch events performed.

With further reference to FIG. 1A, touch scan controller 120-1 detects the performance and/or location of touch events based on detected changes in capacitance levels within sensor 120. For example, when a touch is made on sensor 120, the x-coordinate of the touch can be determined by touch scan controller 120-1 using the drive lines and the y-coordinate can be determined by the sense lines. As such, the drive lines in the x-direction can be scanned line-by-line by touch scan controller 120-1, while the signal on each of the sense lines is read when each row of the drive lines is scanned.

Additionally, according to one embodiment, touch scan controller 120-1 includes the functionality to dynamically swap the orientation of drive and sense lines such that when a touch event is performed on sensor 120, the y-coordinate of the touch event can be determined using the drive lines and the x-coordinate can be determined by the sense lines. Accordingly, during the performance of a scan, each sampling point can be scanned in a manner that enables touch scan controller 120-1 to accurately determine the location of a touch event. In this manner, touch scan controller 120-1 can also detect multiple touch events occurring simultaneously.

Furthermore, touch scan controller 120-1 includes the functionality to distinguish between various touch input types. In one embodiment, touch scan controller 120-1 can distinguish between various touch input types based on the amount of surface area covered by a touch event. For instance, touch inputs covering smaller surface areas may be associated with finger tips, stylus tips, eraser tips, brush tips, etc., whereas touch inputs covering larger surface areas may be associated with other parts of the user's hand (e.g., user's palm).

Also, touch scan controller 120-1 can be configured to accept and/or track specified touch inputs types while simultaneously ignoring and/or rejecting other types of contemporaneous touch input. For example, in one embodiment, touch scan controller 120-1 can be configured to accept and/or track a specific input type, such as a stylus, and simultaneously ignore and/or reject touch input received from other forms of touch input, such as touch inputs received via finger tips, hands, palms, etc.

Additionally, touch scan controller 120-1 can dynamically adjust scanning sequences or patterns performed by sensor 120 in response to a detection of a specific touch input type. According to one embodiment, upon determining the type of touch input received (e.g., finger, stylus, eraser, brush, etc.), touch scan controller 120-1 can send control signals to sensor 120 to adjust which drive lines are to be scanned, which correspondingly affects which signals on each of the sense lines is read. By adjusting the scan pattern of sensor 120 in this manner, touch scans performed by sensor 120 may proportionally reduce the amount of power consumed by computer system 100 during an input detection phase in which only the area near the affected touch is scanned.

Furthermore, according to one embodiment, touch scan controller 120-1 communicates the location of touch events to a touch input driver (not pictured) for further processing by components within computer system 100. For instance, data gathered by touch scan controller 120-1 concerning detected touch events may be made available to operating system 237 (e.g., via an API) and/or applications executed from main memory 135 for further processing.

Main processor 125 processes instructions (e.g., received from applications executed from memory) to read data received from touch sensitive panel 200 and/or optional input devices (e.g., optional input device 140). Optional input 140 may include input devices which include, but are not limited to, keyboards, mice, joysticks, microphones, etc.

Furthermore, in one embodiment, optional graphics system 141 can include a graphics processor (not pictured) operable to process instructions from applications resident in main memory 135 and to communicate data with processor 125 via internal bus 105 for rendering the data on display screen 101 using frame memory buffer. In this manner, graphics system 141 can generate pixel data for output images from rendering commands and may be configured as multiple virtual graphic processors that are used in parallel (concurrently) by a number of applications executing in parallel.

Figure 2:
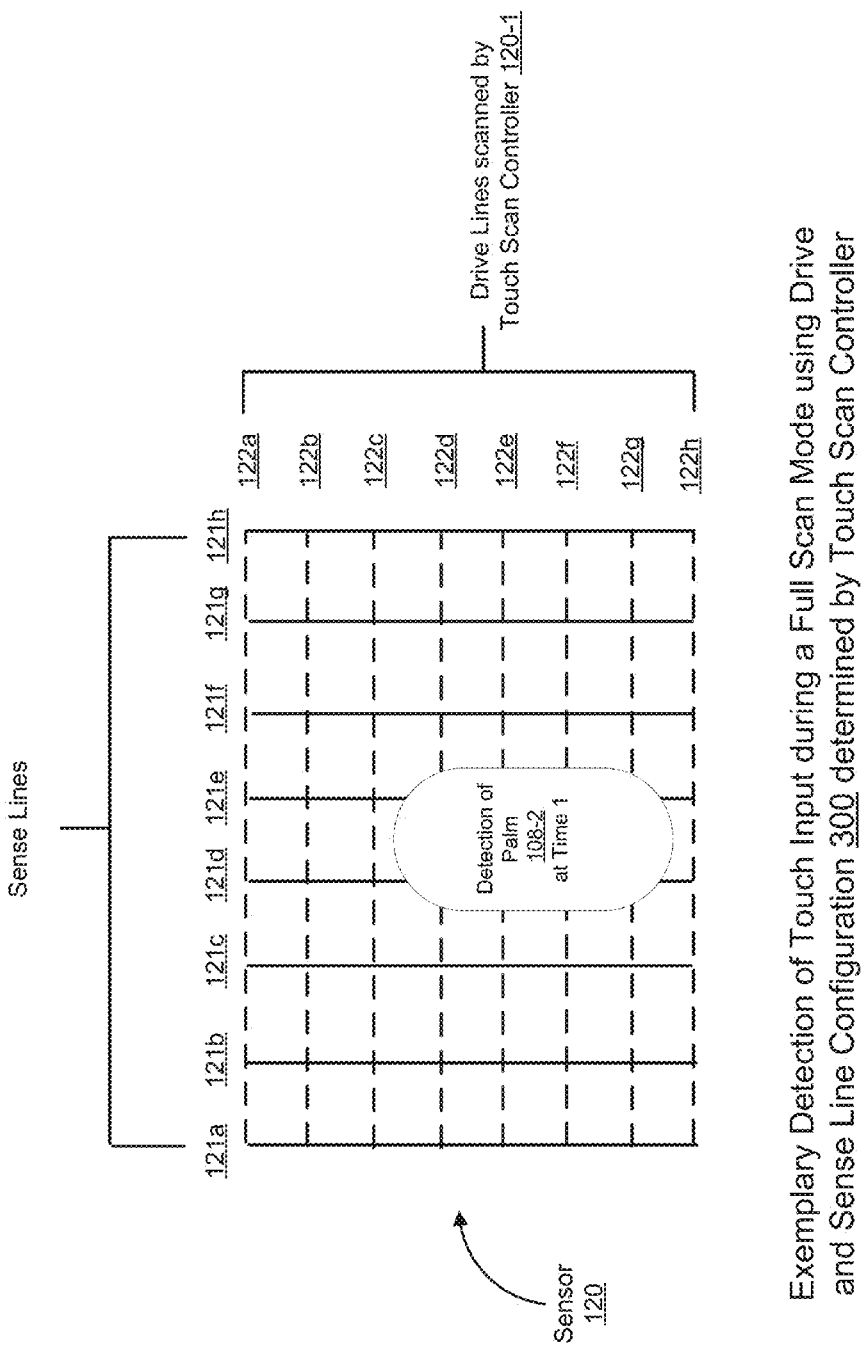
FIG. 2 depicts an exemplary touch scan configuration determined by a touch scan controller for detecting touch input on a touch sensitive panel in accordance with embodiments of the present invention.

FIG. 2 depicts an exemplary touch scan configuration used by a touch scan controller for detecting touch input on a touch sensitive panel in accordance with embodiments of the present invention. As illustrated in FIG. 2, touch scan controller 120-1 may orient sensor 120 using a configuration (e.g., drive and sense configuration 300) in which the x-coordinates of sensor 120 are determined using drive lines 122a, 122b, 122c, 122d, 122e, 122f, 122g, 122h and the y-coordinates can be determined by sense lines 121a, 121b, 121c, 121d, 121e, 121f, 121g, 121h. As such, each drive line in the x-direction can be scanned line-by-line by touch scan controller 120-1 during a "full scan mode", while the signal on each of the sense lines is read when each row of the drive lines is scanned. The above orientation of sense and drive lines is exemplary.

Additionally, as described herein, embodiments of the present invention can limit inadvertent interactions made with a touch sensitive panel in a manner that conserves power resources used by computer system 100 during an input detection phase. For example, in one embodiment, touch scan controller 120-1 can be configured to accept and/or track relevant input received from a specific type of touch input (e.g., touch input provided via stylus), while contemporaneously ignoring and/or rejecting other forms of irrelevant input received via sensor 120 (e.g., user's hand, palm, face, cheek, ear, etc.). For example, with further reference to the embodiment depicted in FIG. 2, sensor 120 can receive touch input from an object (e.g., palm 108-2) at Time 1. As such, the touch input provided by the object at Time 1 can include locational information regarding where the object made contact with sensor 120 (e.g., sampling points registering contact made with palm 108-2) as well as surface area data associated with that contact.

Based on the data received by sensor 120, touch scan controller 120-1 can determine that the touch input received at Time 1 was indeed provided by palm 108-2. In one embodiment, upon recognition of the sampling point coordinates being associated with palm 108-2, touch scan controller 120-1 can be configured to ignore and/or reject the contact made by palm 108-2 with sensor 120 at Time 1 and continue to perform touch scan operations in anticipation of a specified relevant touch input type (e.g., input associated with a stylus, finger, eraser, brush, etc.). Accordingly, sensor 120 may continue to perform touch scans in a manner that enables computer system 100 to consume a reduced amount of power by ignoring and/or not accepting inadvertent touch input or touch events received via sensor 120.

It should be appreciated that embodiments of the present invention are not limited to number of drive and sense lines depicted in FIG. 2, and may include fewer or more drive and/or sense lines for increased or decreased scan resolution as needed. Furthermore, it should be appreciated that embodiments of the present invention are not limited to the pattern in which the drive and sense lines are depicted in FIG. 2, and may include different patterns (e.g., swapping the lines).

Figure 3A:
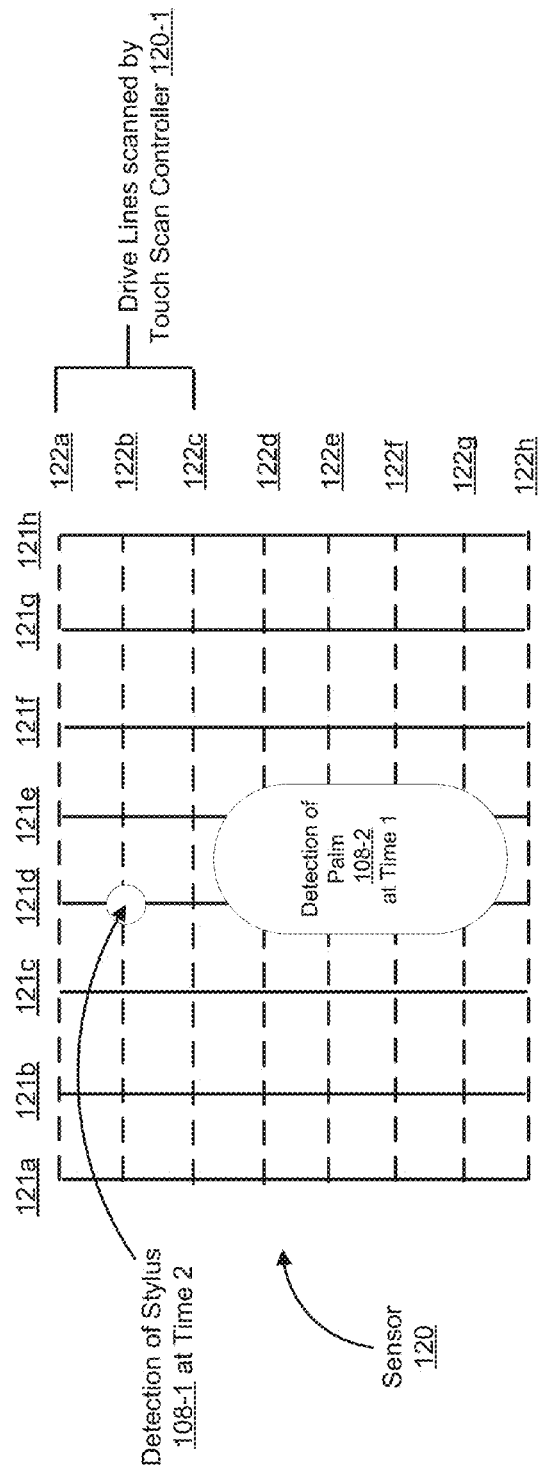
FIG. 3A depicts an exemplary adjustment of touch scan operations responsive to detection of a specific touch input type in accordance with embodiments of the present invention.

FIG. 3A depicts an exemplary adjustment of touch scan operations responsive to detection of a specific touch input type in accordance with embodiments of the present invention. As illustrated in FIG. 3A, sensor 120 can detect touch input from an object (e.g., stylus 108-1) at Time 2 subsequent to the detection of palm 108-2 at Time 1 (see FIG. 2). Stylus 108-1 can be an instrument capable of providing a contact with sensor 120 using a small surface area. As such, the touch input provided by the object at Time 1 can include locational information regarding where the contact was made within sensor 120 (e.g., sampling point coordinates (122b, 121d)) as well as surface area data associated with that contact. Accordingly, based on the data received by sensor 120, touch scan controller 120-1 can determine based on surface area that the touch input received at Time 2 was indeed provided by stylus 108-1 and can correspondingly communicate the input to one or more applications (e.g., executed from memory resident on computer system 100) capable of processing the touch input commands, while ignoring palm 108-2.

Importantly, as illustrated in FIG. 3A, touch scan controller 120-1 can engage sensor 120 to commence performance of a "partial" scan mode in which touch scan controller 120-1 adjusts the scanning sequence or pattern of touch scans performed by sensor 120 in response to a detection of a particular touch input type, such as stylus 108-1. For instance, upon detection of stylus 108-1 at Time 2, touch scan controller 120-1 can send control signals to sensor 120 to adjust which drive lines are to be scanned by sensor 120 which correspondingly affects which sense line signals are read by sensor 120. The subset of drive lines selected by touch scan controller (e.g., drive lines 122a-122c) can be based on a set of sampling points that are proximate to the touch event's current or prior point of detection (e.g., sampling point coordinates (122b, 121d)). Upon receipt of the control signals by sensor 120, drive signals can be sent over only the subset of drive lines which engage a corresponding subset of sense lines (e.g., sense lines 121c-122e) that are operable to detect subsequent touch input provided by the specified touch input type while the remaining drive lines are not scanned. This reduces power as the partial scan only uses a subset of the scan lines of the touch panel.

Accordingly, sense lines overlapping scanned drive lines specified by touch scan controller 120-1 in this manner can be used to receive subsequent touch input from stylus 108-1. By only scanning a subset of the total number of drive lines in this fashion, sensor 120 performs touch scan operations in a manner that consumes a reduced amount of power during an input detection phase. In one embodiment, touch scan controller 120-1 can register null values for drive lines that are not scanned (e.g., 122d-122h), thus transmitting signals to computer system 100 indicating that no touch input was received by sensor 120 subsequent to the input received from stylus 108-1.

Figure 3B:
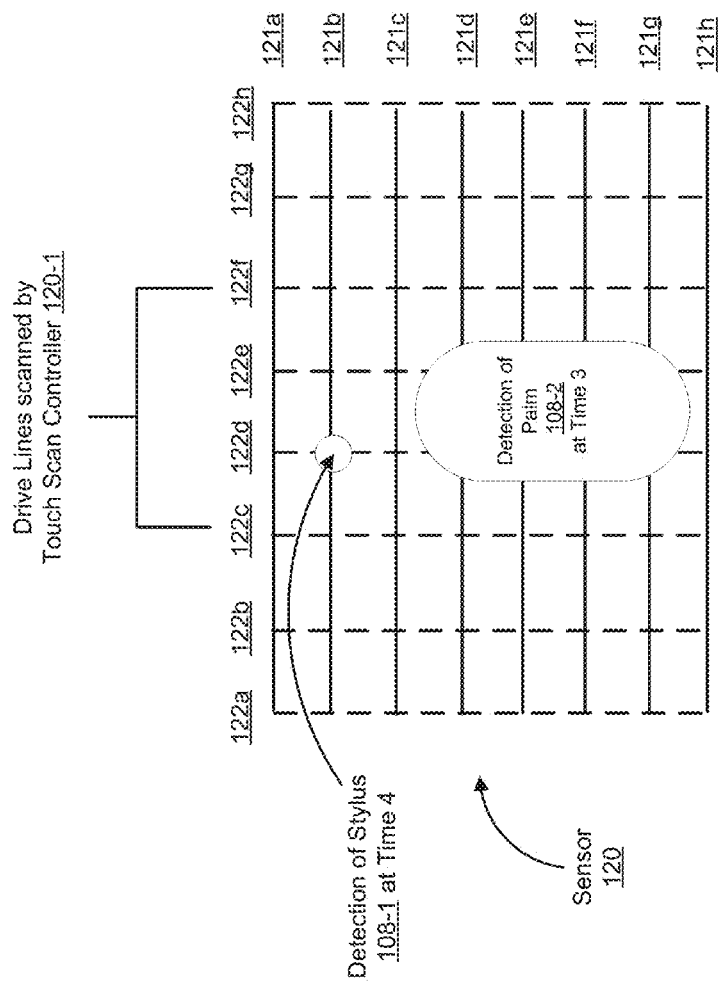
FIG. 3B depicts another exemplary touch scan configuration determined by a touch scan controller for detecting touch input on a touch sensitive panel in accordance with embodiments of the present invention.

FIG. 3B depicts another exemplary touch scan configuration used by a touch scan controller for detecting touch input on a touch sensitive panel in accordance with embodiments of the present invention. As illustrated in FIG. 3B, touch scan controller 120-1 may orient sensor 120 using a configuration (e.g., drive and sense configuration 400) in which the x-coordinates of sensor 120 are determined using sense lines 121a, 121b, 121c, 121d, 121e, 121f, 121g, 121h and the y-coordinates can be determined by sense lines 122a, 122b, 122c, 122d, 122e, 122f, 122g, 122h. As such, each drive line in the y-direction can be scanned line-by-line by touch scan controller 120-1 during a "full" or "partial" scan mode, while the signal on each of the sense lines is read when each column of the drive lines is scanned.

In this manner, based on data received by sensor 120, touch scan controller 120-1 can dynamically adjust drive and sense configurations during input detection operations in real-time. For example, responsive to a determination made that a touch input received by sensor 120 was provided by stylus 108-1 using drive and sense configuration 300 (see FIG. 3A), touch scan controller 120-1 can dynamically re-adjust the orientation of the drive and sense lines of sensor 120 such that touch scan operations are performed using drive and sense configuration 400. In one embodiment, touch scan controller 120-1 can toggle between various different drive and sense configurations in a manner that enables touch scan controller 120-1 to more accurately identify touch inputs and/or signals associated with a detection of a touch input via sensor 120. For instance, with further reference to FIG. 3B, touch scan controller 120-1 can dynamically adjust the drive and sense configuration of sensor 120 from drive and sense configuration 300 to 400 to more accurately identify touch inputs and/or signals associated with palm 108-2 and/or stylus 108-1 at Times 3 and 4, respectively.

Figure 3C:
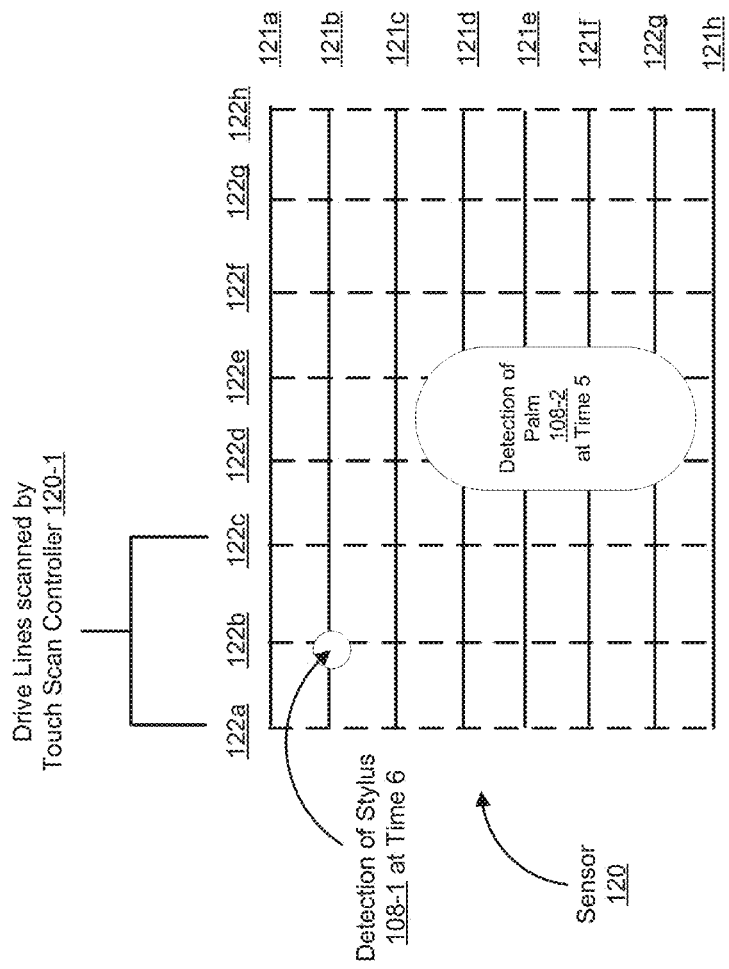
FIG. 3C depicts how a touch scan controller can dynamically adjust the scanning sequences or patterns performed by a sensor responsive to a subsequent detection of a particular type of touch input in accordance with embodiments of the present invention.

FIG. 3C depicts a partial scan in which the touch scan controller can dynamically adjust the scanning sequences or patterns performed by a sensor responsive to a subsequent detection of a particular type of touch input in accordance with embodiments of the present invention. As illustrated in FIG. 3C, sensor 120 receives touch input from an object (e.g., stylus 108-1) at Time 6. As such, the touch input provided by the object at Time 6 includes locational information regarding where the contact was made with sensor 120 (e.g., sampling point coordinates (121b, 122b)). Based on the data received by sensor 120 (e.g., surface area data), touch scan controller 120-1 can determine that the touch input was indeed provided by stylus 108-1.

As illustrated in FIG. 3C, touch scan controller 120-1 can dynamically re-adjust the scanning sequences or patterns performed by sensor 120 in response to detecting stylus 108-1 at Time 6 using a partial scan technique. For instance, upon detection of stylus 108-1 at Time 6, touch scan controller 120-1 can send control signals to sensor 120 to adjust which drive lines are only to be scanned (e.g., drive lines 122a-122c) which correspondingly affects which sense line signals are read by sensor 120 (e.g., sense lines 121a-122c). Furthermore, according to one embodiment, touch scan controller 120-1 can adjust which lines are to be scanned based on a previous detection of the stylus input. For instance, prior to the detection of stylus 108-1 at Time 6, touch scan controller 120-1 can send control signals to sensor 120 to initially scan drive lines 122c-122f based on a previous detection of stylus 108-1 at Time 4 (see FIG. 3B). The subset of scan lines used to track the location of the stylus can be dynamically adjusted to represent those scan lines that are associated with a last known position of the stylus.

Accordingly, if the stylus input is not detected during a partial scan, touch scan controller 120-1 can restore sensor 120 to a previous touch scan sequence or pattern. For example, if sensor 120 does not detect touch input from stylus 108-1 in between Time 4 and Time 6, touch scan controller 120-1 can restore sensor 120 to a default touch scan mode (e.g., "full" touch scan mode in which each drive line is scanned). However, upon a subsequent detection of input received from stylus 108-1, touch scan controller 120-1 can then return sensor 120 to a "partial" scan mode in which a new touch scan sequence or pattern is specified by touch scan controller 120-1. In one embodiment, touch scan controller 120-1 can send control signals to sensor 120 to initially scan drive lines not scanned during a previous "partial" scan in order to detect subsequent instances of a particular type of touch input.

Although FIGS. 2, 3A, 3B and 3C depict touch scan controller 120-1 ignoring and/or rejecting input received from the user's palm, embodiments of the present invention are not limited as such, and may be configured to ignore various other input types. Also, although FIGS. 2-3C depict embodiments in which touch scan controller 120-1 is configured to receive input specifically from a stylus, embodiments of the present invention are not limited as such. For example, embodiments of the present invention may be configured to accept limited receipt of other types of touch input (e.g., eraser, brush, finger tips).

Figure 4A:
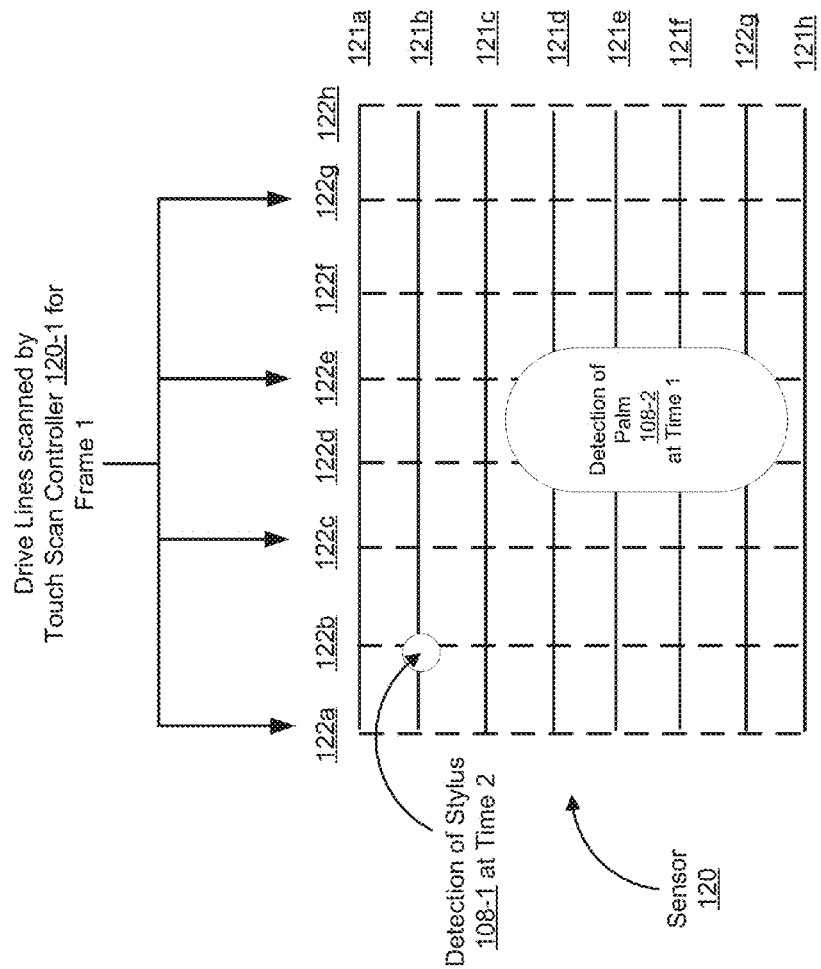
FIG. 4A depicts an exemplary detection and tracking of multiple touch inputs using a configuration determined by a touch scan controller and adjustment of touch scan operations responsive to the detection and tracking of multiple touch inputs in accordance with embodiments of the present invention.
Figure 4B:
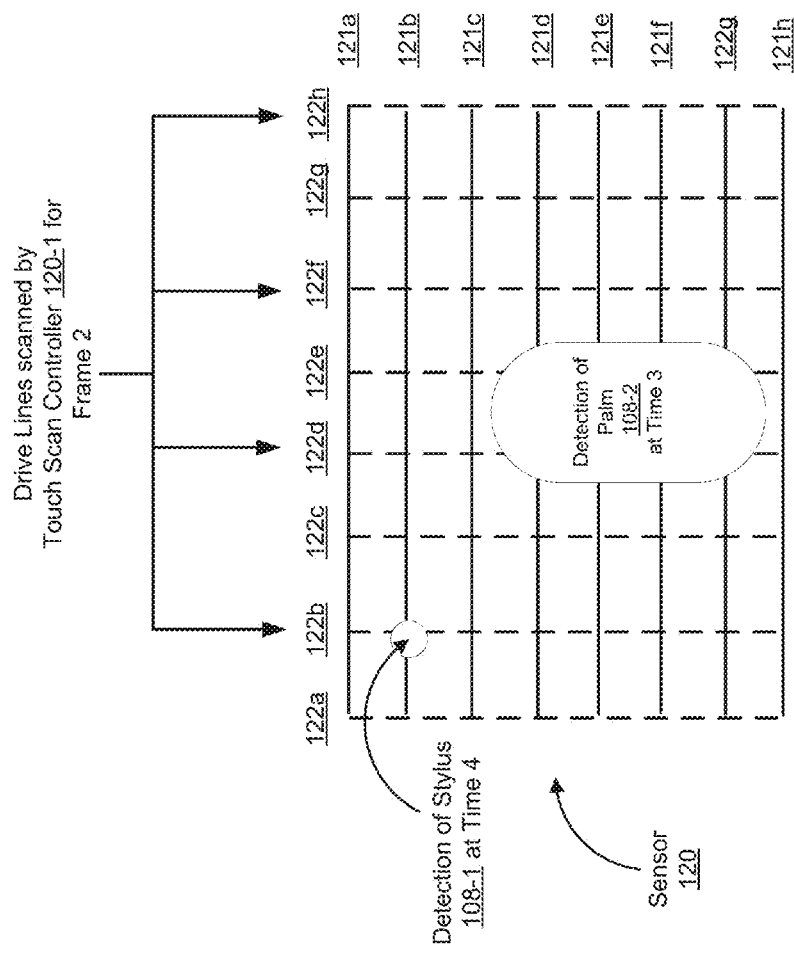
FIG. 4B depicts another exemplary detection and tracking of multiple touch inputs using a configuration determined by a touch scan controller and adjustment of touch scan operations responsive to the detection and tracking of multiple touch inputs in accordance with embodiments of the present invention.

FIGS. 4A and 4B depict an exemplary adjustment of touch scan operations responsive to detection and tracking of multiple touch input types in accordance with embodiments of the present invention. For example, touch scan controller 120-1 can be configured to recognize and/or track input received from multiple touch input types (e.g., touch input provided via stylus and/or palm) received via sensor 120. As illustrated in FIG. 4A, sensor 120 can receive touch input from an object (e.g., palm 108-2) at Time 1 and touch input from another object (e.g., stylus 108-1) at Time 2. As such, the touch inputs provided by both objects at their respective times can include locational information regarding where the contact was made within sensor 120. Therefore, in the manner described by embodiments of the present invention herein, touch scan controller 120-1 can correspondingly determine that the touch inputs were provided by stylus 108-1 and palm 108-2 at their respective times.

Furthermore, as illustrated in FIGS. 4A and 4B, touch scan controller 120-1 can dynamically adjust the scanning sequences or patterns performed by sensor 120 in response to instructions (e.g., received via an application executed from memory resident on computer system 100) specifying touch scan controller 120-1 to detect and/or track input from both stylus 108-1 and palm 108-2 in real-time. For instance, upon detection of stylus 108-1 and/or palm 108-2 during a "full" or "partial" scan mode, touch scan controller 120-1 can send control signals to sensor 120 that adjust which drive lines are to be scanned which correspondingly affects which sense line signals are read by sensor 120.

For example, as illustrated in FIGS. 4A and 4B, touch scan controller 120-1 can dynamically re-adjust the scanning sequences or patterns performed by sensor 120 by scanning every other drive line to implement a lower resolution scan to save power. As illustrated in FIG. 4A, touch scan controller 120-1 can send control signals to sensor 120 to scan drive lines 122a, 122c, 122e, 122g, etc. for one frame and, as illustrated in FIG. 4B, touch scan controller 120-1 can send control signals to sensor 120 to scan drive lines 122a, 122c, 122e, 122g, etc. for a subsequent frame.

By scanning a subset of the drive lines in this fashion, lower resolution touch scans are performed by sensor 120 in a manner that consumes a reduced amount of power during an input detection and/or tracking phase. Accordingly, sensor 120 may perform touch scans in a manner that enables computer system 100 to consume a reduced amount of power by not scanning each drive line while simultaneously allowing input detection of larger surface area touch input types (e.g., palms, hands, faces, cheeks, ears) that may be accepted and/or tracked by applications executed by computer system 100.

Figure 5:
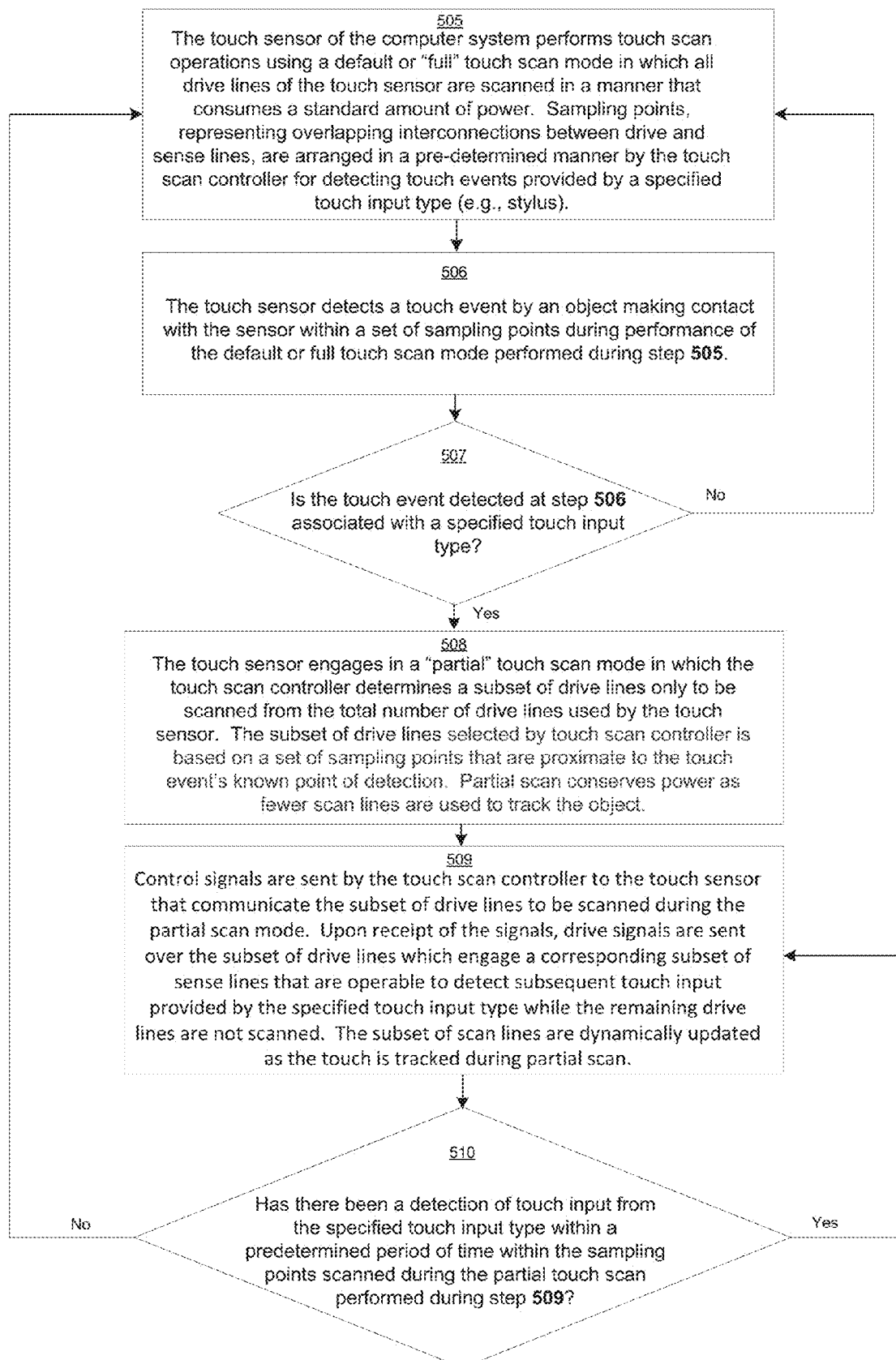
FIG. 5 is a flowchart that depicts an exemplary computer-implemented touch scan adjustment process responsive to detected touch events in accordance with embodiments of the present invention.

FIG. 5 is a flowchart that depicts an exemplary computer-implemented touch scan adjustment process responsive to detected touch event types in accordance with embodiments of the present invention.

At step 505, the touch sensor of the computer system performs touch scan operations using a default or "full" touch scan mode in which all drive lines of the touch sensor are scanned in a manner that consumes a standard amount of power. Sampling points, representing overlapping interconnections between drive and sense lines, are arranged in a pre-determined manner by the touch scan controller for detecting touch events provided by a specified touch input type (e.g., stylus).

At step 506, the touch sensor detects a touch event by an object making contact with the sensor within a set of sampling points during performance of the default or full touch scan mode performed during step 505.

At step 507, a determination is made as to whether the touch event detected at step 506 is associated with a specified touch input type based, for instance, on the surface area of the touch event. If the touch event is associated with the specified touch input type, then the touch sensor engages in a "partial" touch scan mode in which the touch scan controller determines a subset of drive lines only to be scanned from the total number of drive lines used by the touch sensor, as detailed in step 508. If the touch event is not associated with the specified touch input type, then touch sensor continues performing touch scan operations in the manner described in step 505.

At step 508, the touch event detected at step 506 is determined to be associated with the specified touch input type and, therefore, the touch sensor engages in a "partial" touch scan mode in which the touch scan controller prescribes a subset of drive lines to be scanned from the total number of drive lines used by the touch sensor during a default or "full" touch scan mode. The subset of drive lines selected by touch scan controller is based on a set of sampling points that are proximate to the touch event's known point of detection. Partial scans conserve power as fewer scan lines are used to track the object.

At step 509, control signals are sent by the touch scan controller to the touch sensor that communicate the subset of drive lines to be scanned during the partial scan mode. Upon receipt of the signals, drive signals are sent over the subset of drive lines which engage a corresponding subset of sense lines that are operable to detect subsequent touch input provided by the specified touch input type while the remaining drive lines are not scanned. The subset of scan lines are dynamically updated as the touch is tracked during partial scan.

At step 510, a determination is made as to whether touch input from the specified touch input type has been detected within a predetermined period of time within the sampling points scanned during the partial touch scan performed during step 509. If input from the specified touch input type has not been detected within a predetermined period of time, then the touch scan controller attempts to locate the touch event by restoring the touch sensor to a previous default or full touch scan mode, as detailed in step 505. If touch input from the specified touch input type has been detected within a predetermined period of time, then touch sensor continues performing partial touch scan operations as described in step 509 and dynamically updates the subset of scan lines used as the touch is tracked using partial scan.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system.

These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above disclosure. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method of performing touch scan operations on a touch sensitive panel of a computing device, said method comprising:
    scanning a first set of scan lines associated with said touch sensitive panel using a first scan pattern;
    detecting a touch input within said first set of scan lines using said first scan pattern, wherein said touch input is recognized as a touch type that indicates a use case in which interaction with said touch sensitive panel is limited to said touch input; and
    responsive to a detection of said touch input, partially scanning said touch sensitive panel using a second scan pattern to detect subsequent touch inputs of said touch type, wherein said second scan pattern is different than said first scan pattern and wherein less power is consumed by said computing device using said second scan pattern versus said first scan pattern.

2. The method as described in claim 1, wherein said touch input is provided by a stylus tip.

3. The method as described in claim 1, wherein said partially scanning further comprises scanning using a second set of scan lines associated with a previous detection of said touch input, wherein said second set of scan lines is a subset of said first set of scan lines.

4. The method as described in claim 1, where said first set of scan lines comprises a plurality of drive lines, wherein said plurality of drive lines intersect with a plurality of sense lines to produce a plurality of sampling points used for detecting said touch input.

5. The method as described in claim 4, wherein said scanning using a second scan pattern further comprises correlating a subset of scan lines from said first set of scan lines with a set of sampling points used from said plurality of sampling points to detect said touch input to produce said second scan pattern, wherein said second scan pattern comprises said subset of scan lines.

6. The method as described in claim 5, wherein said correlating further comprises registering a set of null input values for a remainder set of scan lines not associated with said subset of scan lines.

7. The method as described in claim 1, further comprising:
    exiting said partial scanning responsive to said touch input being undetected after using said second scan pattern after a predetermined period of time; and
    scanning said touch panel using said first set of scan lines.

8. A system for performing touch scan operations on a touch sensitive panel of a computing device, said system comprising:
    a touch sensor operable to scan a first set of scan lines associated with said touch sensitive panel using a first scan pattern and using a second scan pattern; and
    a controller operable to detect a touch input within said first set of scan lines using said first scan pattern, wherein said touch input is recognized as a touch type that indicates a use case of said computing device in which interaction with said touch sensitive panel is limited to said touch input, wherein said touch sensor, responsive to a detection of said touch input of said touch type, is operable to partially scan using a second scan pattern determined by said controller to detect said touch input, wherein said second scan pattern is different than said first scan pattern and wherein less power is consumed by said computing device scanning with said second scan pattern versus scanning with said first scan pattern.

9. The system as described in claim 8, wherein said touch input is provided by a stylus.

10. The system as described in claim 8, wherein said touch sensor is operable to partially scan using a second set of scan lines associated with a previous detection of said touch input, wherein said second set of scan lines is a subset of said first set of scan lines.

11. The system as described in claim 8, wherein said first set of scan lines comprises a plurality of drive lines, wherein said plurality of drive lines intersect with a plurality of sense lines to produce a plurality of sampling points used for detecting said touch input.

12. The system as described in claim 11, wherein said controller is operable to correlate a subset of scan lines from said first set of scan lines with a set of sampling points used from said plurality of sampling points to detect said touch input to produce said second scan pattern, wherein said second scan pattern comprises said subset of scan lines.

13. The system as described in claim 12, wherein said touch sensor is operable to register a set of null input values for a remainder set of scan lines not associated with said subset of scan lines.

14. The system as described in claim 8, wherein said controller is operable to restore a default touch scan mode to said touch sensitive panel in which said first set of scan lines are scanned responsive to said touch input not being detected after using said second scan pattern after a predetermined period of time.

15. A method of performing touch scan operations on a touch sensitive panel of a computing device, said method comprising:
    scanning a first set of scan lines associated with said touch sensitive panel using a first scan pattern;
    detecting a first touch input and a second touch input within said first set of scan lines using said first scan pattern, wherein said first touch input is a touch type that indicates one of a use case of said computing device in which relevant interaction with said touch sensitive panel is limited to said first touch input; and
    responsive to a detection of said first touch input, partial scanning using a second scan pattern to track said first touch input, wherein said second scan pattern is different than said first scan pattern and wherein less power is consumed by said computing device using said second scan pattern versus said first scan pattern.

16. The method as described in claim 15, wherein said first touch input is provided by a stylus and said second touch input is provided by a palm of a user.

17. The method as described in claim 15, wherein said scanning further comprises driving a voltage through a plurality of drive lines and said detecting a first touch input and a second touch input further comprises using a plurality of sense lines to detect said first and second touch inputs, wherein said plurality of drive lines overlap said plurality of sense lines to produce a plurality of sampling points, wherein said first and second touch inputs are detected based on changes in capacitance within said plurality of sampling points.

18. The method as described in claim 17, wherein said using a second scan pattern further comprises correlating a subset of scan lines from said first set of scan lines with a set of sampling points used from said plurality of sampling points to detect said first and second touch inputs to produce said second scan pattern, wherein said second scan pattern comprises said subset of scan lines.

19. The method as described in claim 15, wherein said detecting a first touch input and a second touch input further comprises swapping an orientation of said plurality of drive lines and said plurality of sense lines to detect positions associated with said first touch input and said second touch input.

20. The method as described in claim 19, further comprising:
    tracking a position associated with said second touch input using a third scan pattern, wherein said third scan pattern comprises alternating scan lines within a subset of scan lines determined to be correlated with said second touch input.

* * * * *